United States Patent [19]
Banas et al.

[11] Patent Number: 4,759,813
[45] Date of Patent: Jul. 26, 1988

[54] PROCESS FOR FORMING AND CRIMPING A BEAD

[75] Inventors: Mark D. Banas, Cuyahoga Falls; Lawrence E. Chlebina, Akron; Brady G. Greenlease, Akron; James D. Stokes, Akron; Michael W. Smith, Mogadore; Robert N. Steagall, deceased, late of Diamond, all of Ohio, by Betty C. Steagall, administratrix

[73] Assignee: The Goodyear Tire & Rubber Company, Akron, Ohio

[21] Appl. No.: 26,600

[22] Filed: Mar. 17, 1987

Related U.S. Application Data

[63] Continuation-in-part of Ser. No. 9,518, Jan. 30, 1987, abandoned.

[51] Int. Cl.$^4$ .................. B29D 30/48; B21D 47/06; B21D 47/32
[52] U.S. Cl. ................................. 156/136; 72/148; 140/88
[58] Field of Search ............... 29/605; 72/146, 147, 72/148, 371; 140/88; 156/130.7, 136, 422; 242/74, 74.1, 74.2, 78.1, 78.3, 82

[56] References Cited

U.S. PATENT DOCUMENTS

| | | |
|---|---|---|
| 1,635,187 | 7/1927 | Lough et al. |
| 1,855,426 | 4/1932 | Stevens .................... 156/422 |
| 2,083,350 | 6/1937 | Shook ........................ 154/9 |
| 2,151,306 | 3/1939 | Shook ........................ 154/9 |
| 2,190,805 | 2/1940 | Shook ........................ 154/9 |
| 2,587,517 | 2/1952 | Paxson .................... 242/78.3 |
| 2,821,348 | 1/1958 | Langen ...................... 72/148 |
| 2,902,083 | 9/1959 | White ....................... 154/14 |
| 2,920,837 | 1/1960 | Wingard ............... 242/78.3 X |
| 2,979,109 | 4/1961 | Dieckmann ........... 242/78.3 X |
| 2,996,107 | 8/1961 | Dieckmann ................. 154/9 |
| 3,051,221 | 8/1962 | Strozewski .............. 156/422 |
| 3,330,491 | 7/1967 | Williams .................... 140/88 |
| 3,429,765 | 10/1964 | Mallory et al. .......... 156/422 |
| 3,528,162 | 9/1970 | Sagara .................... 72/148 X |
| 4,219,375 | 8/1980 | Vandale et al. ......... 156/136 |
| 4,452,660 | 6/1984 | Davies et al. ........... 156/422 |
| 4,496,411 | 1/1985 | Davies et al. ........... 156/136 |
| 4,597,157 | 7/1986 | Ichikawa ............... 156/422 X |

FOREIGN PATENT DOCUMENTS

| | | | |
|---|---|---|---|
| 640379 | 4/1962 | Canada .................... 156/422 |
| 714177 | 8/1954 | United Kingdom ...... 242/78.3 |
| 759332 | 10/1956 | United Kingdom ........ 72/148 |
| 509322 | 4/1976 | U.S.S.R. ..................... 72/148 |

*Primary Examiner*—E. Michael Combs
*Attorney, Agent, or Firm*—Frederick K. Lacher; T. P. Lewandowski

[57] ABSTRACT

A bead former (14) has a gripping mechanism (90,92) for gripping a leading end (106) of a bead ribbon (12) at a position recessed in the surface (18) of the former (14) during the initial rotation of the former (14). The gripping mechanism (90,92) has a seat member (92) movable radially outward of the former (14) into a supporting position at the surface (18) of the former (14) after releasing the leading end (106) for supporting the leading end (106) during the latter rotation of the former (14). A pressure roller (20) is rotatably supported in a guide cage (54) mounted on a dual arm (22,48) having a dual actuation system (34,60) for moving the guide cage (54) and pressure roller (20) into position for guiding and compacting the convolutions of bead ribbon (12) wrapped around the former (14) and for providing a high pressure force to crimp the splice area (124) of the bead (16). A bead handling mechanism is provided to remove and accumulate the beads (16) in a spaced condition on belts (180) of unloading fingers (125) from the bead former (14).

5 Claims, 11 Drawing Sheets

PROCESS FOR FORMING AND CRIMPING A BEAD

This application is a continuation-in part of copending U.S. patent application Ser. No. 009,518 filed Jan. 30, 1987, now abandoned and relates, generally, to a method and apparatus for forming a bead by wrapping a number of convolutions of a bead ribbon around the former.

It is especially directed to crimping of the bead while it is still on the former. The bead, along with other beads, formed at the same time may then be removed from the former by an end effector having unloading fingers with belts for accumulating beads while maintaining the spacing thereof.

Heretofore it has been proposed to take a formed bead, place it in a groove of an anvil roll and press the bead into the groove with an ironing roller. The formed beads have also been placed in a press having grooved upper and lower dies for confining and pressing the bead rings in the area of the bead splices. The formed bead has also been placed between rollers for pressing the area of bead splices. In each of these cases it has been necessary to remove the formed bead from the bead former and transfer it to a suitable pressing apparatus which has necessitated additional handling of the formed bead.

The present invention is directed to a method and apparatus for crimping the bead while it is still on the former to avoid the additional handling of the formed bead. One of the problems associated with bead formers has been the gripping of the leading end of the bead ribbon which has resulted in the leading end protruding from the inside of the formed bead. It has been proposed to use a gripper which swings radially outward pressing the leading end against a segment of the former. This may reduce the bending and avoid a permanent set in the leading end of the bead ribbon; however, the leading end is still unsupported and still protrudes from the inside of the bead and therefore the bead must be removed from the former to crimp or wrap the bead splice area. With the apparatus and method of this invention, the leading end of the bead ribbon is gripped during the initial winding of the bead ribbon and then released and pressed radially outward into a supported position against the inner surface of the bead so that the bead splice can be crimped on the bead former.

Heretofore pressing rollers have been used for compacting the convolutions of the bead ribbon; however, no provision has been made for increasing the pressure during the rolling of the bead splice area to provide crimping. In accordance with this invention, the pressing roller is mounted in a guide cage having guiding ribs for positioning a plurality of bead ribbons on the former. A dual arm system supports the guide cage and pressing roller and has dual actuating cylinders for selectively guiding the bead ribbons and pressing the beads with the desired pressures for initially compacting the ribbons and finally crimping the beads. With this system the crimping can be done without rotating the former by stroking the pressing roller along the surface of the former. This makes possible the insertion of belt carrying unloading fingers of an end effector while the crimping is being done. Then, in accordance with the system of this invention, the beads can be removed from the former and accumulated on the belts while at the same time maintaining the spacing of the beads.

In accordance with an aspect of the invention there is provided a bead forming and crimping apparatus comprising a rotatable cylindrical former for winding a bead ribbon in a plurality of convolutions to form the bead, the former having a gripping mechanism for gripping a leading end of the bead ribbon at a recessed position below the surface of the former, means to rotate the former an initial amount to wrap the bead ribbon around the former a predetermined number of revolutions, roller means to press the outer surface of the bead ribbon as the former is rotated to compact the convolutions of the bead ribbon laid on the former, the gripping mechanism including means for releasing the leading end and means for moving the leading end radially outward to a support position at the surface of the former, means to rotate the former a latter amount to wrap the bead ribbon around the former a predetermined number of additional revolutions until a trailing end of the bead ribbon is pressed against the bead, means for applying pressure to compact the convolutions of the bead ribbon and for increasing the pressure applied by the roller means to crimp the bead and means to press the roller means along the bead to crimp the bead splice area between the leading end and the trailing end.

In accordance with another aspect of the invention there is provided a method of forming and crimping a bead comprising:

(a) gripping a leading end of a bead ribbon at a position below the surface of a cylindrical former;

(b) rotating the cylindrical former to wrap the bead ribbon around the former a predetermined number of revolutions;

(c) pressing an outer surface of the bead ribbon with a pressure roller as the former is rotated to compact the convolutions of the bead ribbon laid on the former;

(d) releasing the leading end of the bead ribbon;

(e) moving the leading end radially outward into contact with the convolutions at a support position at the surface of the former and providing support for the leading end at the support position;

(f) rotating the former a predetermined number of additional revolutions;

(g) continuing the rolling of the outer surface of the bead ribbon;

(h) positioning a trailing end of the bead ribbon over the former at a position spaced from the leading end providing a bead splice area between the ends;

(i) increasing the pressure applied by the roller; and (j) pressing the roller along the bead between the leading end and the trailing end to crimp the bead splice area.

In accordance with still another aspect of the invention there is provided a system for crimping and handling tire beads comprising means for wrapping a plurality of bead ribbons around a generally cylindrical former at predetermined spaced-apart positions to form a plurality of beads at the predetermined spaced-apart positions, means for crimping the beads, means to insert a plurality of unloading fingers into position inside the beads and in engagement with the inner periphery of each of the beads without changing the predetermined spaced-apart positions and means for releasing the beads from the cylindrical former to permit removal of the unloading fingers and the beads from the cylindrical former.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

Figure 1:
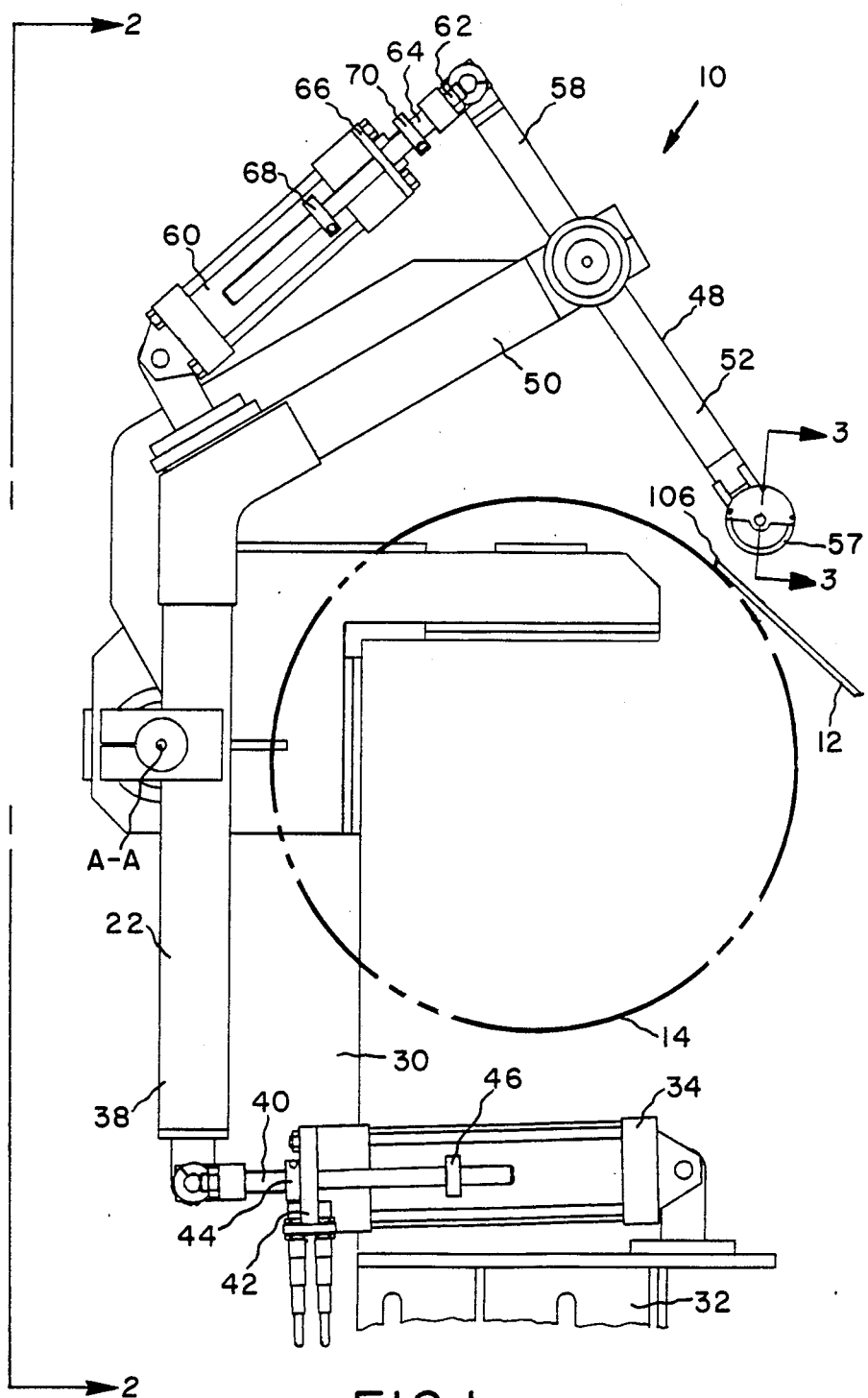
FIG. 1 is a front elevation of a bead forming and crimping apparatus embodying the invention showing the former schematically in dot-dash lines.
Figure 2:
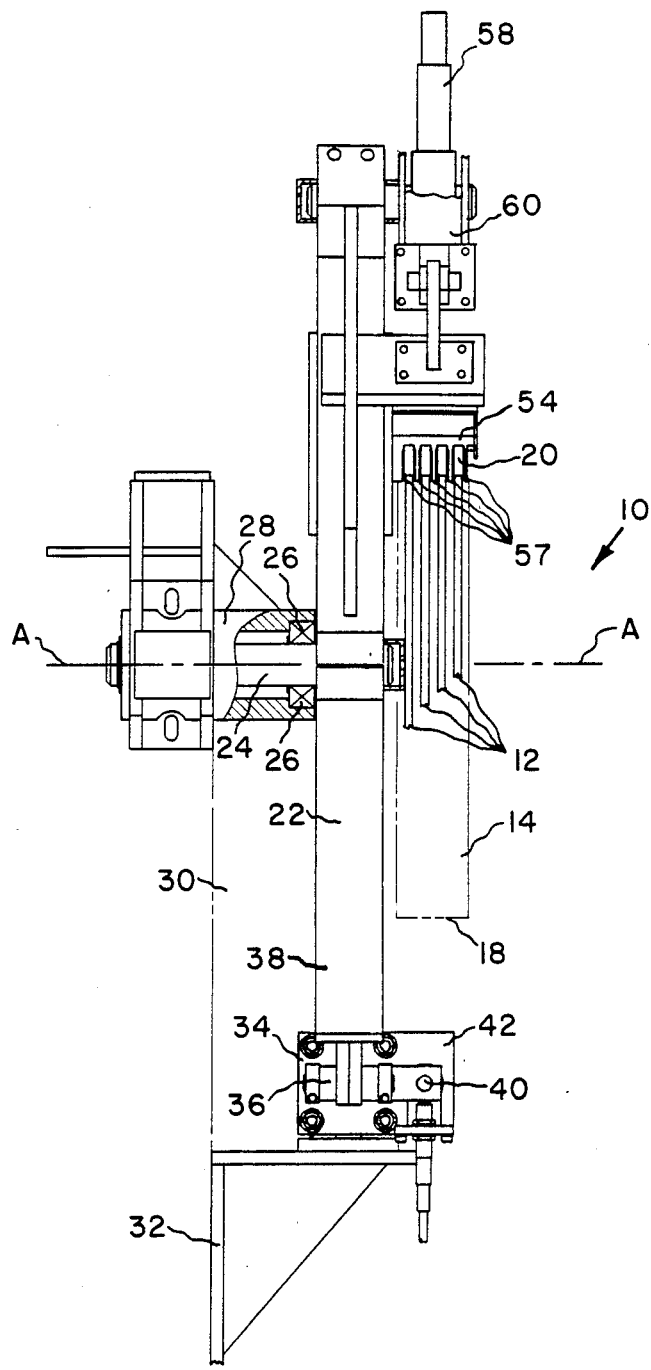
FIG. 2 is a side elevation taken along line 2—2 in FIG. 1 with parts being broken away.
Figure 4:
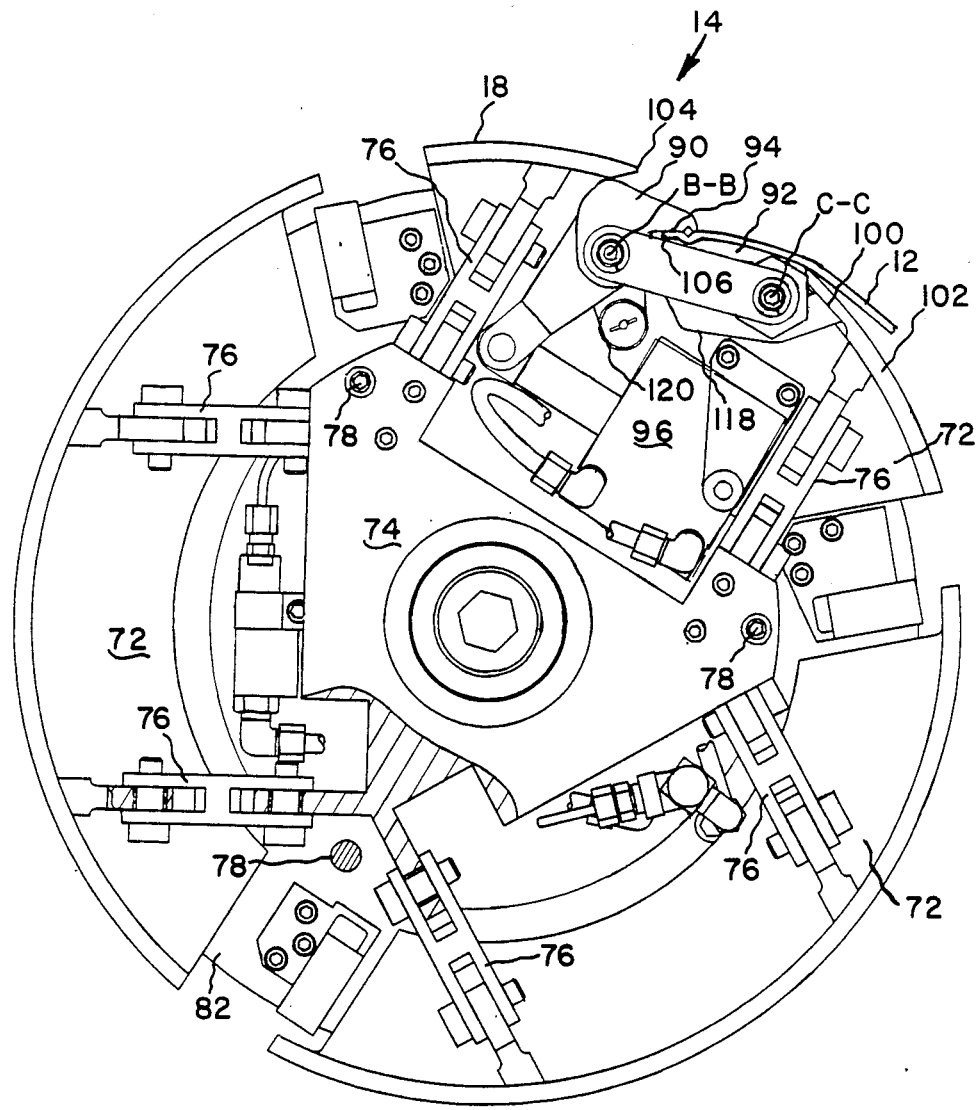
FIG. 4 is an enlarged front elevation of the bead former in the expanded position showing the gripper arm and gripper seat member in the gripping position with parts being broken away.
Figure 5:
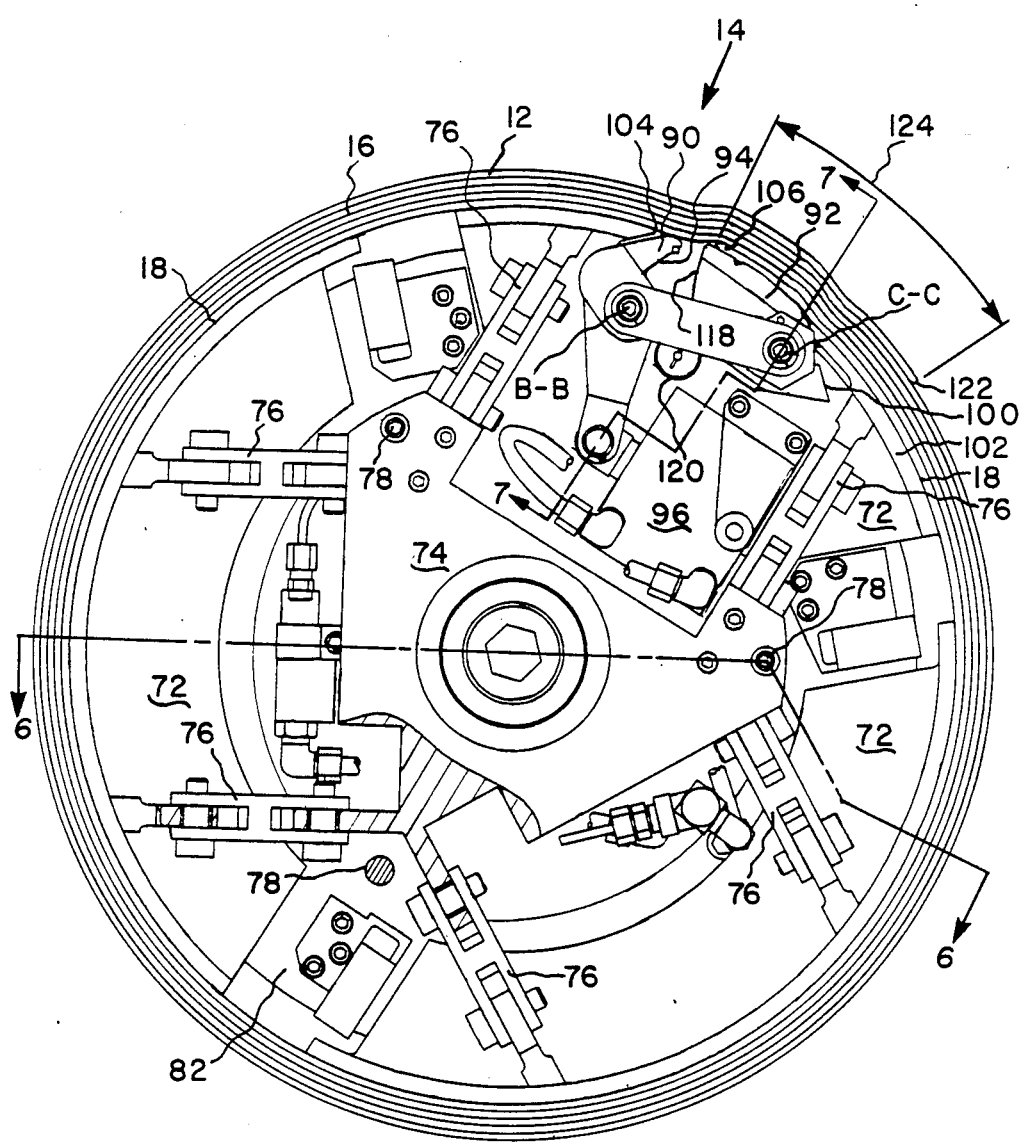
FIG. 5 is an enlarged front elevation of the bead former shown in FIG. 4 in the disengaged condition with the gripper seat member expanded to support a leading end of the bead ribbon and with the unloading fingers shown in section taken along line 5—5 in FIG. 8.
Figure 6:
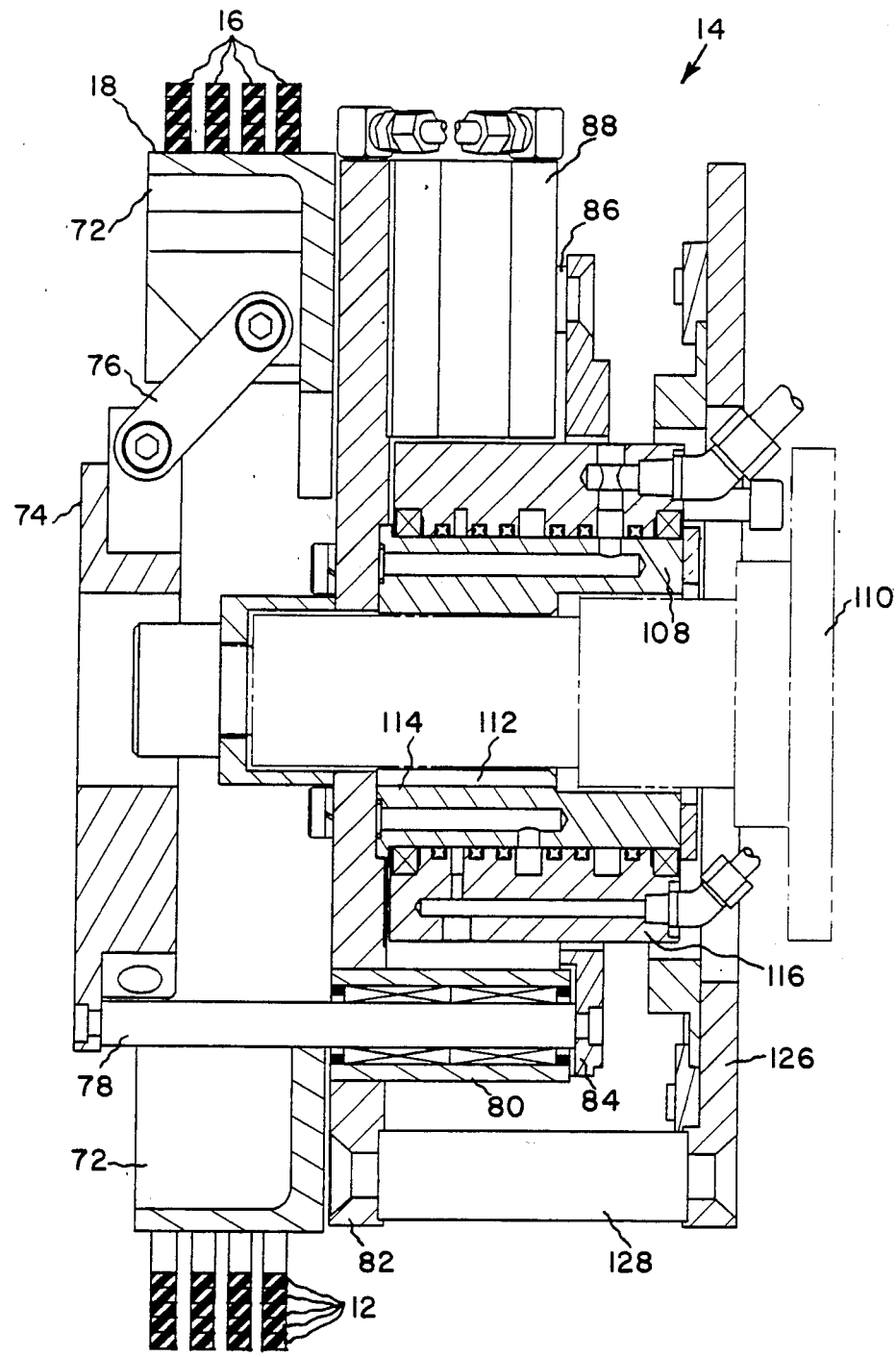
FIG. 6 is a sectional view taken along line 6—6 in FIG. 5 but showing the former in the retracted position.

Referring to FIGS. 1, 2 and 4, a bead forming and crimping apparatus 10 is shown in which a plurality of bead ribbons 12 are wrapped around a former 14 to form a plurality of beads 16, as shown in FIGS. 5 and 6. The bead ribbons 12 have strands of high strength, relatively nonextensible material, such as wire coated with an insulating material which may be of rubber. As the bead ribbons 12 are wrapped around the former 14 they are pressed against an outer surface 18 of the former 14 by a roller 20.

Figure 3:
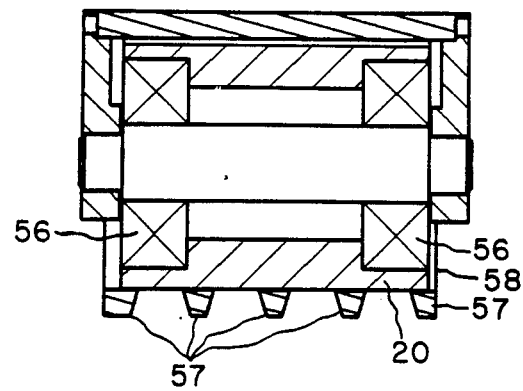
FIG. 3 is an enlarged sectional view of the guide cage taken along line 3—3 in FIG. 1.

As shown in FIGS. 1, 2 and 3, the roller 20 is carried by a pressing arm means including a pivot arm member 22 mounted on a shaft 24 rotatably supported by bearings 26 in bushing 28 mounted on an upright supporting member 30 connected to a supporting structure such as bracket 32. A first pressure means such as first pneumatic cylinder 34 is mounted on the bracket 32 and has a piston rod 36 connected to a lower end 38 of the pivot arm member 22. A movement-limiting rod 40 is connected to the lower end 38 of the pivot arm member 22 and extends through an opening in a stop plate 42 mounted on the first pneumatic cylinder 34. Adjustable stops 44 and 46 are mounted on the rod 40 at predetermined positions for controlling the swinging movement of the pivot arm 22 about an axis A—A of the shaft 24.

Crimp arm member 48 is rotatably mounted on an upper end 50 of the pivot arm member 22 and has a roller supporting portion 52 on which a guide cage 54 is mounted. As shown in FIG. 3, the roller 20 is rotatably mounted in the guide cage 54 on bearings 56. Guide members such as ribs 57 at spaced-apart positions on the guide cage 54 are provided to engage side edges of the bead ribbons 12 and guide the bead ribbons into spaced positions on the outer surface 18 of the former 14.

An actuating portion 58 of the crimp arm member 48 extends away from the pivotal connection to the pivot arm member 22 in a direction opposite to the roller supporting portion 52 and is connected to a second pressure means such as a second pneumatic cylinder 60 mounted on the pivot arm member and connected to the actuating portion 58 by a piston rod 62. A control rod 64 is connected to the actuating portion 58 and extends through a stop plate 66 mounted on the second pneumatic cylinder 60. Stops 68 and 70 are adjustably mounted on the control rod 64 for limiting the movement of the piston rod 62 and therefore the swinging movement of the crimping arm member 48.

Referring to FIGS. 4 and 6, the former 14 is of the expandable type with a chuck having three segments 72 hingedly connected to a pivot plate 74 by pivot links 76. The pivot plate 74 is mounted on linear shafts 78 in linear bearings 80 mounted on a front flange 82 of the former 14. The linear shafts 78 are connected to a shaft flange 84 which is connected to a piston rod 86 of a double-acting pneumatic cylinder 88 mounted on the front flange 82 for moving the shaft flange toward and away from the front flange so that the linear shaft 78 will move the pivot plate 74 toward and away from the front flange causing the segments 72 to be moved between the retracted position shown in FIG. 6 and an expanded position shown in FIG. 4.

Figure 7:
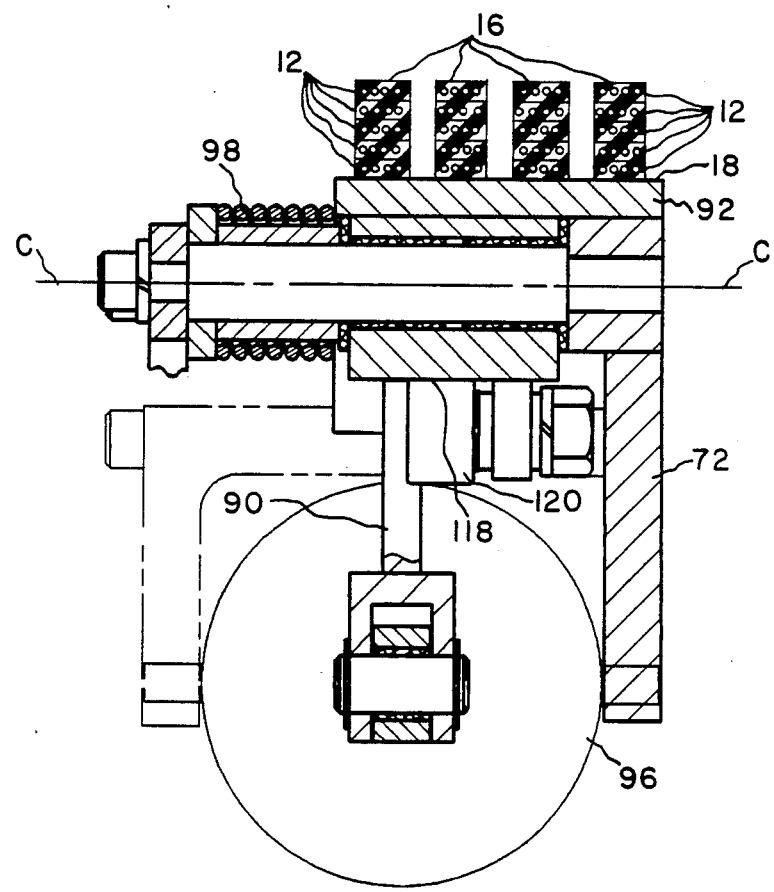
FIG. 7 is an enlarged fragmentary sectional view taken along line 7—7 in FIG. 5.

Mounted on one of the segments 72 is a gripping and supporting mechanism including a gripper arm 90 rotatably mounted about a first axis B—B and a swingable gripper seat member 92 rotatably mounted about a second axis C—C. The gripper arm 90 has a gripping surface 94 at one end and is connected to a pneumatic double-acting piston and cylinder assembly 96 at the other end for swinging the arm from a gripping position, shown in FIG. 4, to a release position, shown in FIG. 5. Referring especially to FIG. 7, the gripper seat member 92 is engageable with a spring 98 for rotating the gripper seat member 92 from a support position, shown in FIG. 5, to a gripping position, shown in FIG. 4. A stop surface 100 at one end of the gripper seat member 92 is engageable with a flange 102 of the segment 72. The flange 102 has an opening 104 through which the bead ribbons 12 can be fed over the gripper seat member 92 into the position shown in FIG. 4 where the gripper arm 90 may be rotated by the piston and cylinder assembly 96 for urging the gripping surface 94 against a leading end 106 of each of the bead ribbons 12 as shown in FIG. 4. In this embodiment the leading end 106 is gripped while the former 14 is expanded to the position shown in FIG. 4.

The front flange 82 is connected to a cylindrical supporting member 108 for mounting on a spindle 110 having a key 112 engageable with a keyway 114 in the cylindrical supporting member 108. The spindle 110 may be connected to a suitable power means for rotating the former 14 and controlled by suitable control means for stopping the former at a desired position. A rotary air joint including a housing 116 may be provided around the cylindrical supporting member 108 for communicating air under pressure to the cylinder 88 for expanding and contracting the segment 72 and to double-acting piston and cylinder assembly 96 for rotating the gripper arm 90.

After the leading end 106 of each the bead ribbons 12 is clamped between the gripper arm 90 and the gripper seat member 92, the former 14 is rotated in the counterclockwise direction, as shown in FIG. 4, for a predetermined number of revolutions and the second pneumatic cylinder 60 is actuated at a low pressure of about 20 psi (1.4 kg/cm$^2$) to rotate the crimp arm member 48 and urge roller 20 into engagement with the ribbons 12. This compacts the convolutions of bead ribbons 12 laid on the flange 102 of the segments 72 partially forming the beads 16. In this embodiment, the former 14 is rotated three times. At this time, the piston and cylinder assembly 96 is actuated to rotate the gripper arm 90 in a counterclockwise direction pulling the gripping surface 94 away from the leading end 106 of each of the ribbons 12. The roller cam connection between the gripper arm 90 and the gripper seat member 92 then causes the gripper seat member to rotate in a clockwise direction about the axis C—C into the position shown in FIG. 5. The roller cam connection includes a cam surface 118 engageable with a roller follower 120 mounted on a follower arm attached to the gripper arm 90. When the gripper arm 90 is rotated in a counterclockwise direction, the roller follower 120 is moved into engagement the cam surface 118 urging the gripper seat member 92 into the position shown in FIG. 5 with the leading end 106 of each of the ribbons 12 pushed into engagement with the inner surfaces of the beads 16. The former 14 is then rotated an additional number of revolutions to a position where a trailing end 122 is spaced from the leading end 106 of each of the bead ribbons 12, as shown in FIG. 5, providing a bead splice area 124 between the ends. The former 14 is then rotated until the bead splice area 124 is under the roller 20. At this time, the second pneumatic cylinder 60 mounted on the pivot arm member 22 is actuated at a high pressure of about 75 psi (5.3 kg/cm$^2$) to press the roller 20 against the outer surface 18 of the beads 16 to crimp the beads in the bead splice area 124. The first pneumatic cylinder 34 is then actuated to advance the roller 20 along the bead splice area 124 in a clockwise direction, as shown in FIG. 1, causing the roller to be stroked without rotating the former 14. In this way unloading fingers 125 of an end effector 127 can be moved into position between the segments 72 and inside the beads 16 before the segments are collapsed and while the beads are being crimped. Where the unloader is used after the beads are crimped, means such as a servomotor may be mounted on the former 14 to rotate the former while the roller 20 is pressed against the beads 16 in the bead splice area 124.

Referring to FIG. 6, the former 14 may have a rear flange 126 connected to the front flange 82 by flange rods 128. The shaft flange 84 is engageable with the rear flange 126 to limit the movement of the linear shaft 78 and the pivot plate 74 to the right as shown in FIG. 6.

Figure 8:
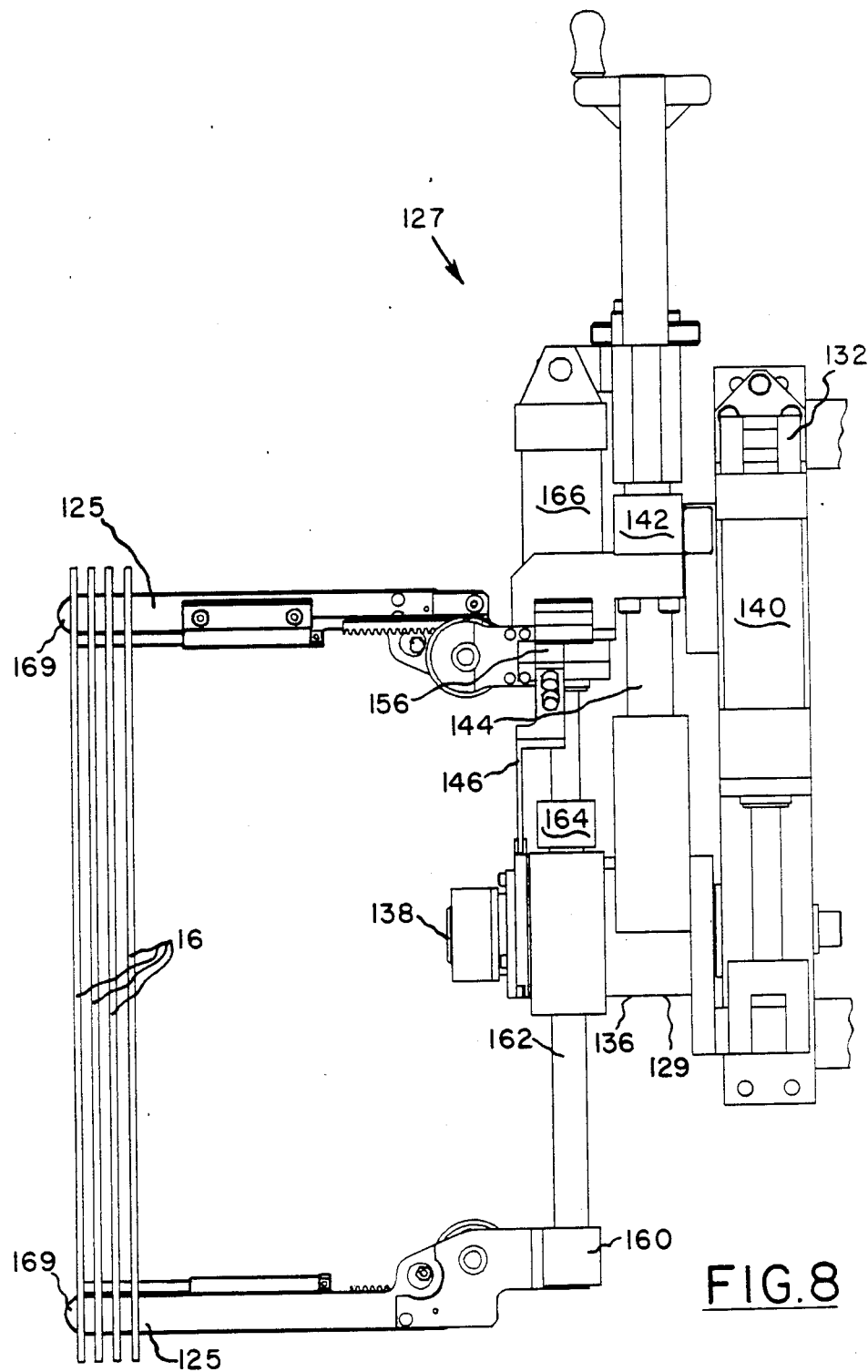
FIG. 8 is a side elevation of the finger mount assembly shown mounted on a robot arm and with the unloading fingers in position for insertion into the former shown in FIG. 5, the angle of the upper unloading finger being tilted to show a side perspective.
Figure 9:
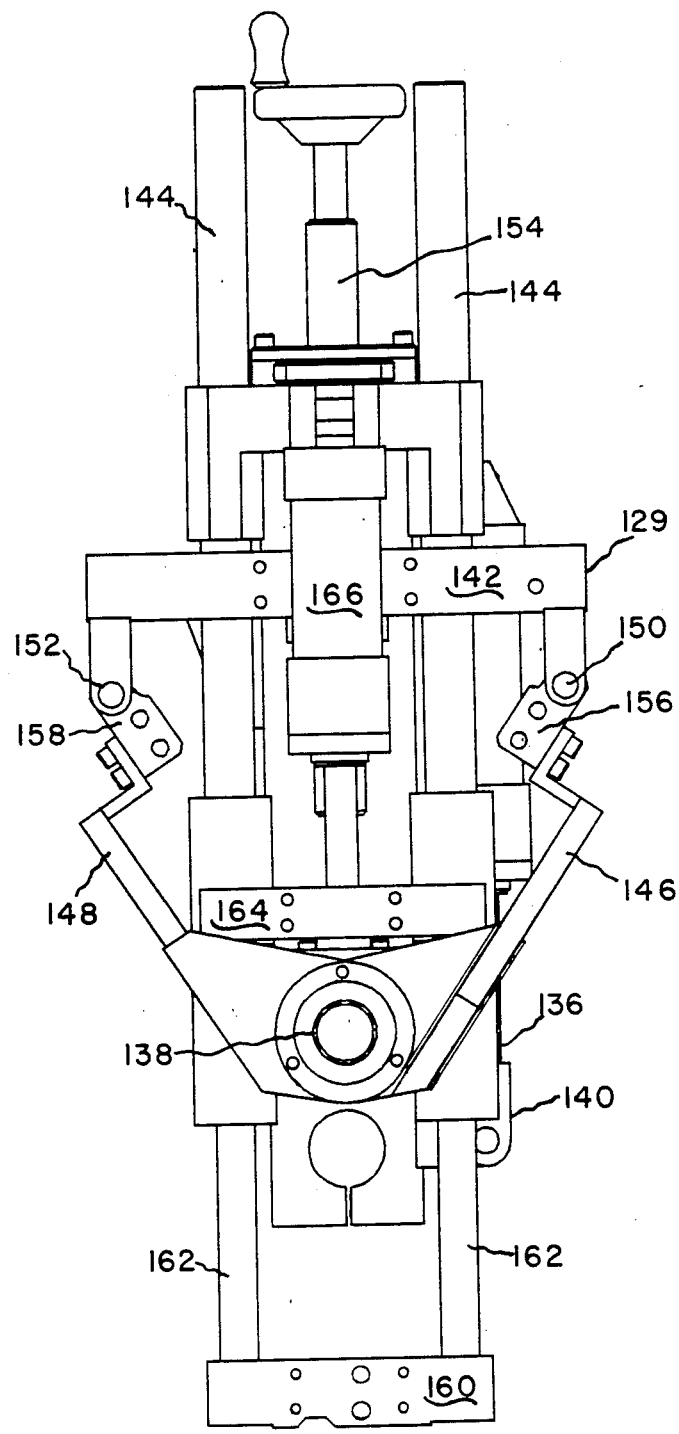
FIG. 9 is a front elevation of the finger mount assembly with the unloading fingers removed.
Figure 10:
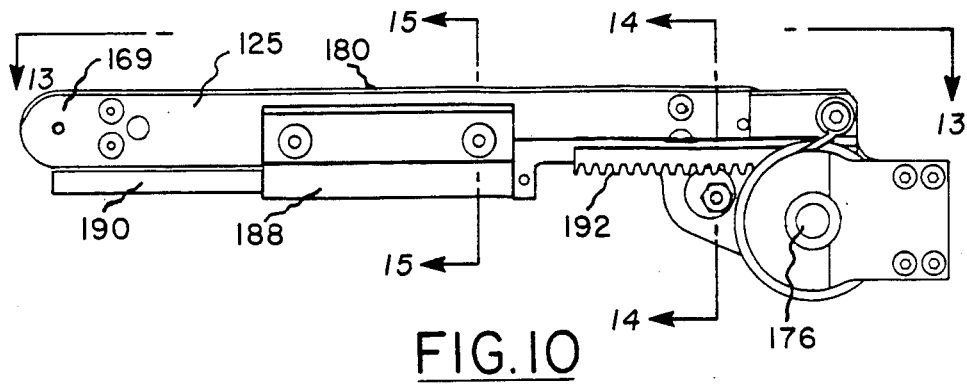
FIG. 10 is an enlarged side elevation of one of the unloading fingers shown in FIG. 8.

Referring to FIGS. 8 and 9, a finger mount assembly 129 is shown mounted on a robot arm 132 for moving the unloading fingers 125 from a pickup position in the former 14, as shown in FIG. 5, to a remote position for unloading the beads 16 into a suitable container (not shown). The finger mount assembly 129 includes a housing 136 rotatably mounted on a shaft 138 extending through the robot arm 132 and adjustable to an angular position by an air cylinder 140 mounted on the robot arm. An upper bar member 142 is slidably mounted on linear shafts 144 extending upwardly from the housing 136. Guide arms 146 and 148 are pivotally mounted on the shaft 138 at the lower end and pivotally mounted to the upper bar member 142 at pins 150 and 152 at each end of the bar member. An adjustment screw 154 is threaded in the upper bar member 129 and is rotatably connected to the housing 136 for moving the upper bar member 142 and thereby changing the angle of the guide arms 146 to accommodate different diameter beads 16. Upper mounting brackets 156 and 158 are attached to the upper ends of the guide arms 146 and 148 for supporting two of the unloading fingers 125. A lower mounting bracket 160 is connected to the housing 136 by rods 162 attached to a lower bar 164 which is movable to raise and lower the lower bracket by means of an air cylinder 166 attached to the housing.

Referring to FIGS. 10 through 15, the unloading fingers 125 are shown in more detail. Each of the unloading fingers 125 includes a base plate 168 for attaching to the mounting brackets 156, 158 and 160. A main frame member 170 is mounted on the base plate 168 and extends to a front end 169. A side plate 172 is spaced from and connected to the main frame member 170. An end plate 174 is fastened to the base plate 168 and is spaced from the main frame member 170 for supporting a shaft 176. Mounted on the shaft 176 is a sprocket 178 for supporting and driving a timing belt 180 extending over a front pulley 182 and idler pulleys 184 and 186 rotatably mounted on the main frame member 170 and side plate 172.

Mounted on the side plate 172 is a rod guide 188 for slidably supporting an actuating rod 190 extending toward the front end 169 of each of the fingers 125. Fastened to the rod 190 is a rack 192 engageable with a pinion gear 194 rotatably mounted on a one-way clutch 196 mounted on the shaft 176. The one-way clutch 196 is operable to rotate the shaft 176 in the clockwise direction upon movement of the rod 190 and rack 192 to the right as shown in FIG. 12.

Figure 12:
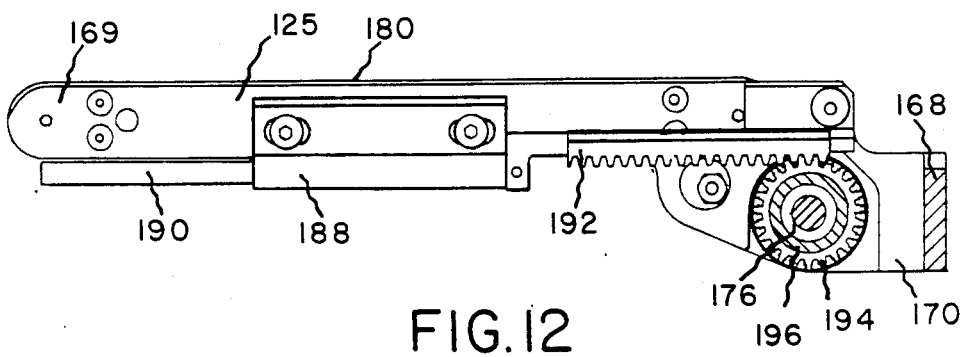
FIG. 12 is a sectional view taken along line 12—12 in FIG. 13.
Figure 13:
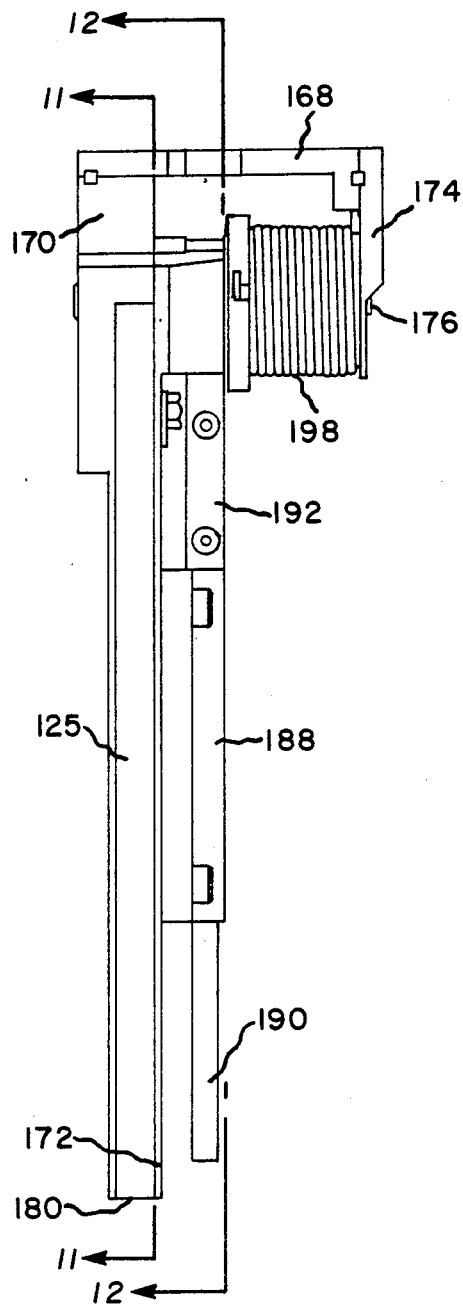
FIG. 13 is a plan view taken along line 13—13 in FIG. 10.
Figure 14:
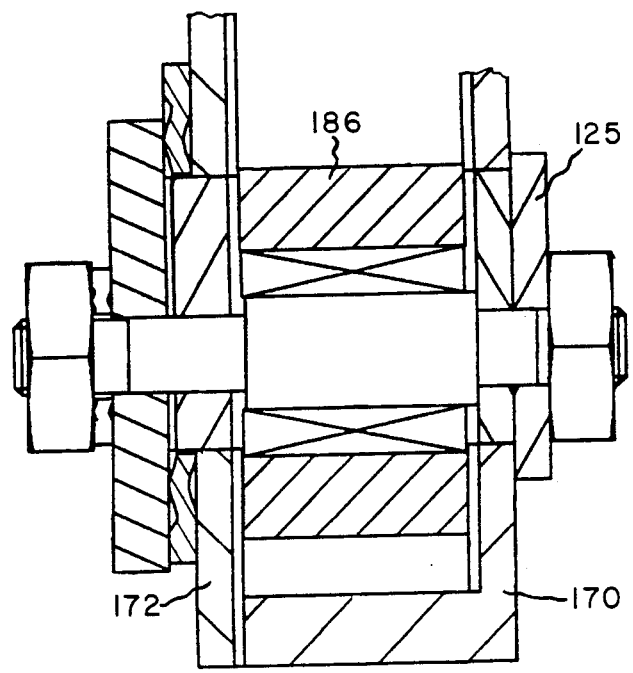
FIG. 14 is a sectional view taken along line 14—14 in FIG. 10.
Figure 15:
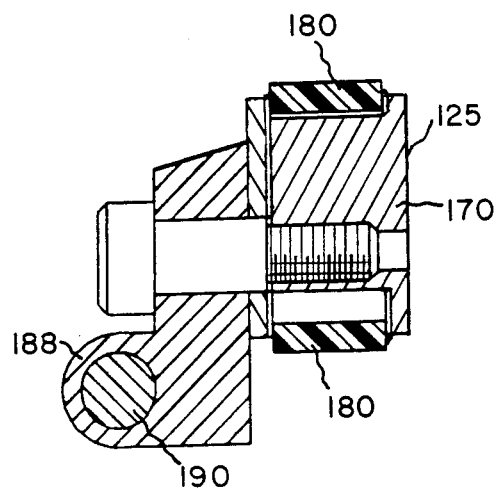
FIG. 15 is a sectional view taken along line 15—15 in FIG. 10.

A return spring 198 is fastened at one end to the end plate 174 and at the other end to the pinion gear 194 for rotating the pinion gear in a counterclockwise direction to return the rack 192 and actuating rod 190 to the extended position shown in FIG. 12.

Figure 11:
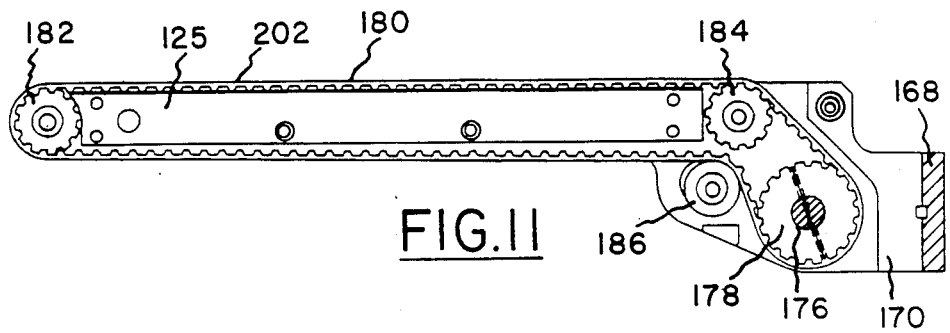
FIG. 11 is a sectional view taken along line 11—11 in FIG. 13.

In operation, the end effector 127 is moved by the robot arm 132 into alignment with and toward the former 14 so that the front ends 169 of the unloading fingers 125 are inserted into the former as shown in FIG. 5. This is done simultaneously with the crimping of the beads 16. As the unloading fingers 125 enter the former 14, the actuating rod 190 engages a strike plate 200 mounted on the former 14 causing the actuating rod to move to the right, as shown in FIG. 12, relative to the side plate 172. The pinion gear 194 is rotated in a clockwise direction causing the upper surface of the belt 202 to move toward the right, as shown in FIG. 11, at the same speed the unloading fingers are inserted into the former 14 but in the opposite direction from the direction of movement of the unloading fingers. This lays the timing belt 180 on the underside of the beads 16 and thereby maintains the spacing between the beads.

The first pneumatic cylinder 34 and second pneumatic cylinder 60 of the former 14 are then actuated to move the pivot arm member 22 and crimp arm member 48 in a counter clockwise direction and move the roller 20 into the position shown in FIG. 1 spaced from the former 14. The cylinder 88 is then actuated to move the piston rod 86 to the left, as shown in FIG. 6, causing the pivot plate 74 to move to the left and retract the segments 72 to the retracted position shown in FIG. 6. After the segments 72 are collapsed the unloading fingers 125 along with the end effector 127 are moved out of the former 14.

After the formed, crimped beads 16 are moved away from the former 14, the leading end 106 of each of a new set of bead ribbons 12 is placed over the gripper seat member 92. Then the cylinder 88 may be actuated to move the piston rod 86 to the right, as shown in FIG. 6, causing the pivot plate 74 to move toward the front flange 82 and expand the segments 72 to the position shown in FIGS. 4 and 5. At the same time the piston and cylinder assembly 96 may be actuated to rotate the gripper arm 90 in a clockwise direction disengaging the roller follower 120 from the cam surface 118 and permitting the gripper seat member 92 to rotate in a counterclockwise direction to the gripping position, shown in FIG. 4. The gripping surface 94 of the gripper arm 90 is then urged into gripping engagement with the leading end 106 of each of the bead ribbons 12 as shown in FIG. 4. The roller 20 may then be moved into compacting engagement with the ribbons 12 and the procedure described above repeated for forming, compacting and crimping the beads 16.

After another four beads 16 are formed and crimped, the end effector 127 is actuated and the abovedescibed procedure is repeated. However, when the unloading fingers 125 enter the former 14 the four beads 16, which are already carried by the timing belt 180, are moved away from the front end 169 creating a space for the next four beads. This eliminates any movement between the belt 180 and the beads 16 maintaining them at a predetermined spacing. This procedure can be repeated until the timing belt 180 is filled which, in this embodiment, is accomplished with twelve beads. The end effector 127 can then be moved by the robot arm 132 to an unloading position where the beads 16 can be placed in the predetermined spaced positions in a suitable container. At that time the air cylinder 166 is actuated to retract the lower bracket 160 and release the beads so that the unloading fingers 125 can be removed from the beads 16. The end effector 127 is then actuated to pull the unloading fingers 125 out of the beads 16 and return the end effector to a position adjacent the former 14. The air cylinder 166 is then actuated to extend the lower bracket 160 to the position shown in FIG. 8 whereupon the apparatus is in condition for picking up another group of beads 16.

While a certain representative embodiment and details have been shown for the purpose of illustrating the invention, it will be apparent to those skilled in the art that various changes and modifications may be made therein without departing from the spirit or scope of the invention.

What is claimed is:

1. A method of forming and crimping a bead comprising:
    (a) gripping a leading end of a bead ribbon at a position below the surface of a cylindrical former;
    (b) rotating said cylindrical former to wrap said bead ribbon around said former a predetermined number of revolutions;
    (c) pressing an outer surface of said bead ribbon with a pressure roller as said former is rotated to compact the convolutions of said bead ribbon laid on said former;
    (d) releasing said leading end of said bead ribbon;
    (e) moving said leading end radially outward into contact with said convolutions at a support position at the surface of said former and providing support for said leading end at said support position;
    (f) rotating said former a predetermined number of additional revolutions;
    (g) continuing the rolling of said outer surface of said bead ribbon;
    (h) positioning a trailing end of said bead ribbon over said former at a position spaced from said leading end providing a bead splice area between the ends;
    (i) increasing the pressure applied by said roller; and
    (j) pressing said roller along said bead between the leading end and said trailing end to crimp the bead splice area.

2. The method of claim 1 wherein said leading end of said bead ribbon is gripped between a gripper arm rotatably mounted on said former about a first axis and a gripper seat member rotatably mounted on said former about a second axis spaced from said first axis, and said leading end is moved radially outward to a support position by the rotation of said gripper seat member to said support position.

3. The method of claim 1 wherein said roller is supported by at least one arm rotatably mounted on a supporting structure and actuated by a first pressure means for swinging movement of said roller into engagement with said bead ribbon on said former, and said pressing of an outer surface to compact the convolutions of said bead ribbon and crimp said bead is provided by actuating a second pressure means.

4. The method of claim 3 wherein said roller is mounted on a crimp arm rotatably mounted on a pivot arm and said pivot arm is rotatably mounted on said supporting structure, said first pressure means is a piston and cylinder assembly connecting said supporting structure and said pivot arm, and said second pressure means is a piston and cylinder assembly connecting said pivot arm and said crimp arm further comprising actuating said first piston and cylinder assembly to move said roller into engagement with said bead ribbon and actuating said second piston and cylinder assembly to apply pressure to said bead ribbon.

5. The method of claim 4 wherein said first pressure means rotates said pivot arm during crimping of said bead to stroke said roller along said bead while said former is stationary so that an unloader can be moved into engagement with said bead while said bead is being crimped.

* * * * *

UNITED STATES PATENT AND TRADEMARK OFFICE
CERTIFICATE OF CORRECTION

PATENT NO. : 4,759,813

DATED : July 26, 1988

INVENTOR(S) : Mark D Banas; Lawrence E Chlebina; Brady G Greenlese; James D Stokes; Michael W Smith; Robert N Steagall It is certified that error appears in the above-identified patent and that said Letters Patent is hereby corrected as shown below:

Cover page - [75] Inventors: Line 3,
"G. Greenlease" should read --G. Greenlese--.

Signed and Sealed this

Eighteenth Day of July, 1989

Attest:

DONALD J. QUIGG

Attesting Officer

Commissioner of Patents and Trademarks